United States Patent Office 3,528,982
Patented Sept. 15, 1970

3,528,982
N-DIALKYLAMINOALKYL-3,4-DIHYDRO-
2(1H)-QUINAZOLINONES
John W. Cusic and William E. Coyne, Skokie, Ill., assignors to G. D. Searle & Co., Chicago, Ill., a corporation of Delaware
No Drawing. Continuation-in-part of application Ser. No. 557,371, June 14, 1966. This application May 10, 1968, Ser. No. 728,330
Claims priority, application Great Britain, June 13, 1967, 27,226/67
Int. Cl. C07d 51/48
U.S. Cl. 260—256.4                12 Claims

ABSTRACT OF THE DISCLOSURE 3,4-dihydro-2(1H)-quinazolinones having an aminoalkyl substituent at the 1- or 3-position are described herein. These compounds possess anti-inflammatory, analgesic, hypotensive, anti-ulcer, anti-bacterial, anti-protozoal, anti-fungal, and anti-algal activity. The compounds are prepared by the reaction of an aminoalkyl halide with a 3,4-dihydro-2(1H)-quinazolinone which is unsubstituted at the 1- or 3-position.

SUMMARY OF THE INVENTION

The present application is a continuation-in-part of application Ser. No. 557,371, filed June 14, 1966 and now abandoned.

The present invention relates to a group of 3,4-dihydro-2(1H)-quinazolinones having a dialkylaminoalkyl or similar substituent at the 1- or 3-position. More particularly, the present invention relates to a group of compounds having the following general formula

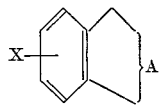

wherein X is selected from the group consisting of hydrogen, methyl, and halogen and A is

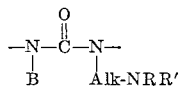

wherein Alk is lower alkylene separating the nitrogens attached thereto by at least two carbon atoms; —NRR' is selected from the group consisting of di(lower alkyl)-amino, 1-pyrrolidinyl, piperidino, morpholino, 4-substituted 1-piperazinyl, and benzylmethylamino; B is selected from the group consisting of hydrogen, lower alkyl, benzyl, and

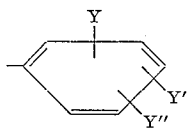

wherein Y, Y' and Y" are each selected from the group consisting of hydrogen, methyl, halogen, hydroxy, methoxy, benzyloxy, and trifluoromethyl. The present invention thus involves both 1-aminoalkyl-3,4-dihydro-2(1H)-quinazolinones and 3-aminoalkyl-3,4-dihydro-2(1H)-quinazolinones.

The halogen atoms referred to above include fluorine, chlorine, bromine, and iodine. The lower alkylene radicals referred to above contain up to 6 carbon atoms and can be exemplified by groups such as ethylene, propylene, trimethylene, and 1,4-pentylene. The lower alkyl radicals referred to above likewise contain up to 6 carbon atoms. Examples of such groups are methyl, ethyl, propyl, isopropyl, and the like. Examples of di(lower alkyl)amino groups would then be dimethylamino, diethylamino, dipropylamino, diisopropylamino, and the like.

In the 4-substituted 1-piperazinyl groups referred to above, the 4-substituent can be a group such as methyl, phenyl, and substituted phenyl. Substituents on this phenyl include methyl and halogen. Again, halogen can be exemplified by fluorine, chlorine, bromine, and iodine.

The compounds of this invention are useful because of their pharmacological properties. In particular, they possess activity as analgesic agents, hypotensive agents, anti-ulcer agents, and anti-inflammatory agents. More particularly, with regard to the anti-inflammatory effect, they have a phenylbutazone-like effect on edematous conditions. This anti-inflammatory utility is demonstrated by the results of a standard test which determines the capacity of a compound to inhibit the edema induced in rats by injection of carrageenin. The procedure is a modification of one described by Winter et al., Proc. Soc. Exper. Biol. and Med., 111, 544 (1962). A compound is administered subcutaneously or intragastrically, dissolved or suspended in 0.5 ml. of aqueous 0.86% sodium chloride, propylene glycol, a mixture of these vehicles, or corn oil, to each of 10 male rats weighing 100–130 grams. A like group of rats is concurrently administered the same vehicle alone and it serves as controls. Precisely 1 hour later, each animal is injected under the plantar surface of each hind foot with 0.1 ml. of an aqueous 1% solution of carrageenin (Marine Colloids, Inc., Type 402). A compound is considered anti-inflammatory if the average total circumference of the 2 treated hind feet, measured in arbitrary units 5 hours after the carrageenin injection, is significantly ($P \leq 0.05$) less than the corresponding value for the control group. Thus, subcutaneous administration of 25 mg. of 1-(2-diethylaminoethyl)-3-phenyl - 3,4 - dihydro-2(1H) - quinazolinone oxalate, 1 - (3 - dimethylaminopropyl) - 3 - (4 - chlorophenyl)-3,4-dihydro-2(1H)-quinazolinone oxalate, 1 - (2 - diethylaminoethyl)-3-propyl-3,4 - dihydro - 2(1H) - quinazolinone, and 1 - benzyl-3-(2 - diethylaminoethyl) - 3,4 - dihydro-2(1H)-quinazolinone oxalate each produced an anti-inflammatory effect when tested in the manner described above.

The present compounds also inhibit germination of seeds of trifolium and they possess anti-biotic activity against a variety of organisms. Thus, they inhibit the growth of bacteria such as *Diplococcus pneumoniae*, protozoa such as *Tetrahymena gelleii*, fungi such as *Trichophyton mentagrophytes* and *Candida albicans*, and algae such as *Chlorella vulgaris*. These compounds can thus be combined with various known excipients and adjuvants in the form of dusts, solutions, suspensions, ointments, and sprays to provide compositions useful for disinfecting purposes.

The organic bases of this invention form pharmaceutically acceptable salts with a variety of organic and inorganic acids. Such salts are formed with acids such as sulfuric, phosphoric, hydrochloric, hydrobromic, hydroidic, sulfamic, citric, lactic, maleic, malic, succinic tartaric, cinnamic, acetic, benzoic, bluconic, ascorbic, and related acids. They also form quaternary ammonium salts with a variety of organic esters of sulfuric, hydrohalic, and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethyl sulfate, methyl benzenesulfonate, ethyl toluenesulfonate, ethylene chlorohydrin, propylene chlorohydrin, allyl bromide, methallyl bromide, and crotyl bromide.

The compounds of the present invention are prepared from an appropriate quinazolinone of the formula

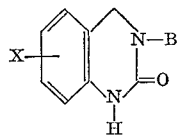

wherein X is defined as above and B is defined as above except that it may not be hydrogen. The corresponding quinazolinone having the B-substituent at the 1-position can also be used. This compound is reacted with a strong base such as sodium hydride and then with an appropriate aminoalkyl halide of the formula

RR'N—Alk—Halogen wherein Alk and —NRR' are defined as above and halogen is preferably chlorine. This gives the desired compounds.

Alternately, the N-monosubstituted quinazolinones referred to in the preceeding paragraph can be reacted with base and an alkylene dihalide to give a 2(1H)-quinazolinone having a haloalkyl substituent on the previously free nitrogen. 3-bromo-1-chloropropane is a particulaly useful dihalide for this purpose and it reacts with a quinazolinone of the type structurally depicted in the preceding paragraph to give a quinazolinone with a 3-chloropropyl substituent at the 1-position. Reaction of such a halide with an amine of the formula HNRR' in which the groups are defined as above gives the desired product. The reaction with the amine is usually carried out in an inert solvent such as 2-butanone in the presence of sodium iodide.

The necessary intermediate 2(1H)-quinazolinone can usually be prepared from an appropriate isatoic anhydride of the formula

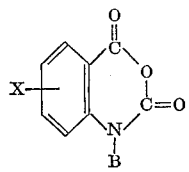

wherein X and B are defined as above. When B is hydrogen, the isatoic anhydride is reacted with an amine of the formula B—NH$_2$ wherein B is defined as above to give a 2-aminobenzamide of the formula

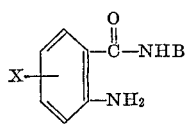

Reduction of the 2-aminobenzamide with lithium aluminum hydride gives the corresponding 2-amino-N-(substituted)benzylamine. This is then reacted with phosgene or with N,N'-carbonyldiimidazole to close the ring and give the desired 3-substituted 3,4-dihydro-2(1H)-quinazolinone.

In the case where the starting material is an N-substituted isatoic anhydride, this is reacted with ammonia to give a 2-(substituted amino)benzamide which is then reduced with lithium aluminum hydride to give the corresponding 2-aminobenzylamine which undergoes ring closure with phosgene or N,N'-carbonyldiimidazole to give the desired 1-substituted 3,4-dihydro-2(1H)-quinazolinone.

To obtain final products where B is hydrogen, isatoic anhydride is reacted with an N-substituted aminoalkyl halide to give a 2-amino-N-(substituted aminoalkyl) benzamide which is then reduced to the corresponding benzylamine and cyclized with phosgene or N,N'-carbonyldiimidazole to give a 3-(N-substituted aminoalkyl)-3,4-dihydro-2(1H)-quinazolinone.

The following examples are presented to further illustrate the present invention; they should not be construed as limiting it in spirit or in scope. In these examples, temperatures are indicated in degrees centigrade (° C.) and quantities are indicated in parts by weight, unless parts by volume are specified. The relation between parts by weight and parts by volume is the same as that existing between grams and milliliters.

EXAMPLE 1

To a solution of 50 parts of 5-methylisatin in 945 parts of acetic acid is added 200 parts by volume of 40% peracetic acid. The solution is stirred for about 65 hours and then poured into an excess of water. The precipitate which forms is separated by filtration and washed with water to give 5-methylisatoic anhydride melting at about 215–250° C.

EXAMPLE 2

A suspension of 96 parts of isatoic anhydride, 72.7 parts of 2,4-dimethylaniline, and 1.8 parts of powdered sodium hydroxide in 600 parts of dioxane is stirred and heated at 70–80° C. for 2 hours and then at 100° C. for 2 hours. The resulting solution is poured into 1500 parts of water and the solid which forms is separated by filtration. This solid is then recrystallized from ethanol to give 2-amino-2',4'-dimethylbenzanilide melting at about 125–135° C.

If the above procedure is repeated using isatoic anhydride and the appropriate substituted aniline, the following products are obtained:

2-amino-4'-chlorobenzanilide melting at about 136–142° C.

2-amino-3'-fluorobenzanilide 2-amino-4'-methylbenzanilide 2-amino-4'-benzyloxybenzanilide melting at about 150–166° C.

2-amino-3',4'-dimethoxybenzanilide melting at about 159–163° C. after recrystallization from ethanol.

2-amino-3',5'-dimethoxybenzanilide melting at about 115–120° C. after recrystallization from ethanol.

2-amino-3',4',5'-trimethoxybenzanilide melting at about 215–219° C. after recrystallization from tetrahydrofuran.

The procedure of the first paragraph above is repeated using appropriately substituted isatoic anhydrides. Thus, 100 parts of 5-chloroisatoic anhydride is reacted with 47 parts of aniline to give 2-amino-5-chlorobenzanilide melting at about 146–151° C. Similarly, 36.5 parts of 5-methyl-isatoic anhydride is reacted with 38 parts of 3,4,5-trimethoxyaniline to give 2-amino-5-methyl-3',4',5'-trimethoxybenzanilide melting at about 177–187° C. after recrystallization from ethanol. Likewise, 4-methylisatoic anhydride is reacted with aniline to give 2-amino-4-methylbenzanilide.

EXAMPLE 3

To a suspension of 64 parts of isatoic anhydride in 160 parts of ethanol is added 107 parts of benzylamine. After the original reaction subsides, the mixture is heated on a steam bath for 30 minutes and then poured into water. The precipitate which forms is separated by filtration and washed with water to give 2-amino-N-benzylbenzamide melting at about 117–122° C.

The above procedure is repeated using isatoic anhydride and 3-trifluoromethylaniline to give 2-amino-3'-trifluoromethylbenzanilide melting at about 128–132° C.; isatoic anhydride and 4-methoxyaniline to give 2-amino-4'-methoxybenzanilide melting at about 117–118° C. after recrystallization from a mixture of ethanol and water; isatoic anhydride and methylamine to give 2-amino-N-methylbenzamide; and isatoic anhydride and allylamine to give 2-amino-N-allylbenzamide melting at about 85–92° C.

EXAMPLE 4

To a stirred, refluxing suspension of 20 parts of 2,6-dichloro-3-methylaniline, 15.8 parts of potassium carbonate, and 225 parts of benzene is added a solution of 21.2 parts of 2-nitrobenzoyl chloride in 20 parts of benzene over a period of 30 minutes. The mixture is refluxed for 2.5 hours and then cooled. 200 parts of water is added and the precipitate which forms is separated by filtration and washed with benzene and with water. The solid is then recrystallized from a mixture of dimethylformamide and water to give 2-nitro-2',6'-dichloro-3'-methylbenzanilide melting at about 175–210° C. In a similar manner, 2-nitrobenzoyl chloride is reacted with 5-chloro-2,4-dimethoxyaniline to give 2-nitro-5'-chloro-2',4'-benzanilide melting at about 184–204° C. after recrystallization from tetrahydrofuran.

14.3 parts of 2-nitro-2',6'-dichloro-3'-methylbenzanilide in 900 parts of tetrahydrofuran is hydrogenated at room temperature and atmospheric pressure using 10 parts of Raney nickel catalyst. When the hydrogen uptake ceases, the mixture is filtered and the tetrahydrofuran solvent is evaporated to leave a residual colorless oil which crystallizes on standing. This product is 2-amino-2',6'-dichloro-3'-methylbenzanilide. If the above reduction procedure is repeated using 2-nitro-2',4'-dimethoxy-5'-chlorobenzanilide, the product is 2-amino-2',4'-dimethoxy-5'-chloro benzanilide melting at about 157–159° C. after recrystallization from ethanol.

EXAMPLE 5

A solution of 25 parts of 2-nitrobenzaldehyde and 25 parts of 2,4-dimethoxyaniline in 270 parts of benzene is refluxed for 4 hours with continuous removal of the water as it is formed. The resultant solution is then cooled, treated with charcoal, filtered, and diluted with hexane. The precipitate which forms is separated by filtration to give N-(2-nitrobenzal)-2,4-dimethoxyaniline melting at about 79–81° C.

A solution of 28.9 parts of N-(2-nitrobenzal)-2,4-dimethoxyaniline in 800 parts of methanol is hydrogenated using 15 parts of Raney nickel catalyst at atmospheric pressure and room temperature. After 1 mole of hydrogen is taken up, the mixture is filtered and the solvent is evaporated to leave a residual oil. This oil is further reduced with 10 parts of lithium aluminum hydride in 110 parts of tetrahydrofuran. The resultant solution is decomposed by the successive addition of 10 parts of water, 10 parts of 15% sodium hydroxide solution, and 30 parts of water. The resultant mixture is then filtered and the solvent is evaporated. The residual dark oil is dissolved in benzene and chromatographed on silica using 10% ethyl acetate in benzene as eluent. The solid which is obtained is recrystallized from ethanol to give 2-amino-N-(2,4-dimethoxyphenyl)benzylamine melting at about 71–74° C.

EXAMPLE 6

To a hot suspension of 20 parts of lithium aluminum hydride in 500 parts of dioxane there is added portionwise, with stirring under nitrogen, a solution of 62.2 parts of 2-amino-2',4'-dimethylbenzanilide in 700 parts of dioxane and the resultant solution is refluxed with stirring for 18 hours. The mixture is then decomposed by the successive cautious addition of 20 parts of water, 20 parts of 15% aqueous sodium hydroxide solution, and 60 parts of water. The mixture is then filtered and the solvent is evaporated from the filtrate to leave a white crystalline residue. This is recrystallized from a mixture of ethanol and water to give 2-amino-N-(2,4-dimethylphenyl)benzylamine melting at about 65–75° C.

The above procedure is repeated using 68.7 parts of 2-amino-4'-chlorobenzanilide and 20 parts of lithium aluminum hydride to give 2-amino-N-(4-chlorophenyl) benzylamine melting at about 85–91° C. Similarly, the reduction of 67 parts of 2-amino-5-chlorobenzanilide with 25 parts of lithium aluminum hydride gives 2-amino-5-chloro-N-phenylbenzylamine melting at about 84–86° C. Likewise, reduction of 68.4 parts of 2-aminobenzanilide with 15 parts of lithium aluminum hydride gives 2-amino-N-phenylbenzylamine melting at about 76–80° C.

If the above lithium aluminum hydride reduction procedure is repeated using 2-amino-5-fluorobenzanilide, 2 - amino - 3' - fluorobenzanilide, 2-amino-4'-methylbenzanilide, 2-amino-4-methylbenzanilide, and 2-amino-N-methylbenzamide, the products obtained are, respectively, 2-amino-5-fluoro-N-phenylbenzylamine, 2-amino - N - (3-fluorophenyl)benzylamine, 2 - amino - N-(4-tolyl)benzylamine, 2-amino-4-methyl-N-phenylbenzylamine, and 2-amino-N-methylbenzylamine.

Reduction of 2-amino-3'-trifluoromethylbenzanilide with lithium aluminum hydride according to the procedure described in the first paragraph above gives 2-amino-N-(3-trifluoromethylphenyl)benzylamine as an oil boiling at about 154–170° C. at 0.1 mm. pressure. Similarly, reduction of 2-amino-4'-methoxybenzanilide gives 2-amino-N-(4-methoxyphenyl)benzylamine melting at about 76–78° C. after recrystallization from ethanol. Likewise, reduction of 2-amino-3',4'-dimethoxybenzanilide gives 2-amino-N-(3,4-dimethoxyphenyl)benzylamine melting at about 97–98° C. after recrystallization from ethanol. Reduction of 2-amino-N-benzylbenzamide in the same way gives 2-amino-N-benzylbenzylamine as an oil.

Reduction of 2-amino-N-allylbenzamide with lithium aluminum hydride according to the procedure described in the first paragraph above gives 2-amino-N-propylbenzylamine as an oil.

EXAMPLE 7

The procedure described in the first paragraph of Example 6 is repeated using other substituted benzanilides and using tetrahydrofuran as the solvent instead of dioxane. In this way, 2-amino-3',4',5'-trimethoxybenzanilide (11 parts) is reduced with a solution of 3.0 parts of lithium aluminum hydride in 340 parts of tetrahydrofuran to give 2-amino-N-(3,4,5-trimethoxyphenyl)benzylamine melting at about 120° C. If this procedure is repeated using other appropriate benzanilides as the starting materials, the following compounds are obtained:

2-amino-N-(4-benzyloxyphenyl)benzylamine melting at about 142–144° C.

2-amino-N-(3,5-dimethoxyphenyl)benzylamine melting at about 93–95° C. after recrystallization from ethanol.

2-amino-N-(2,6-dichloro-3-methylphenyl)benzylamine.

2-amino-N-(2,4-dimethoxy-5-chlorophenyl)benzylamine melting at about 131–133° C. after recrystallization from ethanol.

2 - amino - 5-methyl-N-(3,4,5-trimethoxyphenyl)benzylamine melting at about 150–153° C. after recrystallization from ethanol.

EXAMPLE 8

To a stirred solution of 37.2 parts of 2-amino-N-(2, 4-dimethylphenyl)benzylamine in 870 parts of toluene there is added, at room temperature, a solution of 25 parts of phosgene in 130 parts of toluene over a period of 45 minutes. When the addition is complete, the solution is stirred at reflux for 1 hour. The toluene solvent is then evaporated under reduced pressure to leave a dark residue which is recrystallized twice from ethanol to give 3-(2,4-dimethylphenyl)-3,4-dihydro-2(1H)-quinazolinone as white crystals melting at about 175–200° C.

If the above procedure is repeated using other substituted 2-aminobenzylamines, the following products are obtained:

3 - (4-chlorophenyl) - 3,4-dihydro-2(1H)-quinazolinone melting at about 203–205° C.

3-(3-fluorophenyl)-3,4-dihydro-2(1H)-quinazolinone.

6 - chloro - 3 - phenyl-3,4-dihydro-2(1H)-quinazolinone melting at about 160–165° C.

6-fluoro-3-phenyl-3,4-dihydro-2(1H)-quinazolinone.
7-methyl-3-phenyl-3,4-dihydro-2(1H)-quinazolinone.
3-(4-tolyl)-3,4-dihydro-2(1H)-quinazolinone.
3-phenyl-3,4-dihydro-2(1H)-quinazolinone melting at about 182–187° C.

3-benzyl-3,4-dihydro-2(1H)-quinazolinone melting at about 198–208° C. after recrystallization from ethanol.
3-methyl-3,4-dihydro-2(1H)-quinazolinone.
3-propyl-3,4-dihydro-2(1H)-quinazolinone melting at about 113–117° C. after recrystallization from ethanol.

EXAMPLE 9

To a stirred solution of 10 parts of 2-amino-N-(3-trifluoromethylphenyl)benzylamine in 45 parts of tetrahydrofuran there is added 10 parts of N,N'-carbonyldiimidazole. The mixture is stirred at room temperature for 5 hours and then refluxed for 16 hours. It is then poured into water and the solid which forms is separated by filtration and recrystallized from ethanol to give 3-(3-trifluoromethylphenyl)-3,4-dihydro-2(1H)-quinazolinone melting at about 130–133° C.

If the above procedure is repeated using other substituted 2-aminobenzylamines, the following compounds are obtained:

3-(4-methoxyphenyl)-3,4-dihydro-2(1H)-quinazolinone melting at about 243–245° C. after recrystallization from tetrahydrofuran.

3 - (4 - benzyloxyphenyl) - 3,4 - dihydro - 2(1H)-quinazolinone melting at about 205–208° C. after recrystallization from tetrahydrofuran.

3-(2,4 - dimethoxyphenyl) - 3,4 - dihydro - 2(1H)-quinazolinone melting at about 253–256° C. after recrystallization from tetrahydrofuran.

3-(3,4 - dimethoxyphenyl) - 3,4 - dihydro - 2(1H)-quinazolinone melting at about 180–181° C. after recrystallization from tetrahydrofuran.

3-(3,5 - dimethoxyphenyl) - 3,4 - dihydro - 2(1H)-quinazolinone melting at about 130–134° C. after recrystallization from ethanol.

3-(3,4,5-trimethoxyphenyl) - 3,4 - dihydro-2(1H)-quinazolinone melting at about 185–189° C. In this case, the product crystallizes from the original tetrahydrofuran reaction mixture and is separated therefrom.

3-(2,6-dichloro - 3 - methylphenyl)-3,4-dihydro-2(1H)-quinazolinone melting at about 221–223° C. after recrystallization from ethanol.

3-(2,4 - dimethoxy - 5 - chlorophenyl)-3,4-dihydro-2(1H)-quinazolinone melting at about 235–238° C.

6-methyl - 3 - (3,4,5-trimethoxyphenyl) - 3,4 - dihydro-2(1H)-quinazolinone melting at about 205–215° C. after recrystallization from tetrahydrofuran.

EXAMPLE 10

To a stirred refluxing solution of 63 parts of oxalyl chloride in 1000 parts of methylene chloride is added a solution of 85 parts of diphenylamine in 1330 parts of methylene chloride over a period of about 2 hours. The solution is then refluxed for 2 hours and cooled and 225 parts of aluminum chloride is added over a period of 1 hour. The mixture is then stirred for 16 hours at room temperature and poured into an excess of ice. The methylene chloride layer is then separated, washed with dilute hydrochloric acid, and dried over magnesium sulfate. The solvent is then evaporated to leave a residual solid which is recrystallized from benzene to give N-phenylisatin melting at about 135–138° C.

To a stirred solution of 61 parts of N-phenylisatin in 800 parts of methylene chloride is added 78 parts of 85% pure 3-chloroperbenzoic acid in 2000 parts of methylene chloride. The mixture is stirred for 72 hours at room temperature and then 90 parts of calcium hydroxide is added. It is then stirred for 30 minutes and filtered and the solid is washed with methylene chloride. The solvent is evaporated from the filtrate to leave a solid residue which is recrystallized from benzene to give N-phenylisatoic anhydride melting at about 177–178° C.

36.8 parts of N-phenylisatoic anhydride is reacted with 45 parts of concentrated aqueous ammonia in 160 parts of ethanol according to the procedure described in Example 3 to give 2-anilinobenzamide melting at about 105–120° C. 31 parts of this 2-anilinobenzamide is reduced with 10 parts of lithium aluminum hydride in 400 parts of dioxane according to the procedure described in Example 6 to give 2-aminomethyldiphenylamine as a colorless oil boiling at about 140–160° C. at 0.1 mm. pressure. The 2-aminomethyldiphenylamine obtained in this way is reacted with 20 parts of N,N'-carbonyldiimidazole in 90 parts of tetrahydrofuran according to the procedure described in Example 9 to give 1-phenyl - 3,4 - dihydro-2 (1H)-quinazolinone melting at about 213–214° C.

EXAMPLE 11

50 parts of N-methylisatoic anhydride is reacted with 50 parts by volume of 30% aqueous ammonia solution in 160 parts of ethanol according to the procedure described in Example 3 to give 2-methylaminobenzamide melting at about 158–161° C. 31 parts of this amide is then reduced with 15 parts of lithium aluminum hydride in 500 parts of dioxane according to the procedure described in Example 6 to give 2-methylaminobenzylamine as a colorless oil boiling at about 88–96° C. at 0.15 mm. pressure. The reaction of 10 parts of 2-methylaminobenzylamine with 10 parts of N,N'-carbonyldiimidazole in 45 parts of tetrahydrofuran according to the procedure described in Example 9 gives 1-methyl-3,4-dihydro - 2(1H)-quinazolinone melting at about 143–144.5° C. after recrystallization from ethanol.

EXAMPLE 12

A solution of 27.2 parts of anthranilamide and 21.2 parts of benzaldehyde in 240 parts of benzene is stirred and refluxed for 2.5 hours with continuous removal of the water which is formed. The solution is cooled and the precipitate which forms is separated by filtration to give 2-benzalaminobenzamide melting at about 150–153° C. 36 parts of this 2-benzalaminobenzamide is reduced with 10 parts of lithium aluminum hydride in 500 parts of dioxane according to the procedure described in Example 6 to give 2-benzylaminobenzylamine as a colorless oil boiling at about 140–144° C. at 0.15 mm. pressure. 6 parts of 2-benzylaminobenzylamine is then reacted with 6.7 parts of N,N'-carbonyldiimidazole in 90 parts of tetrahydrofuran according to the procedure described in Example 9 to give 1-benzyl - 3,4 - dihydro-2(1H)-quinazolinone melting at about 140–155° C.

EXAMPLE 13

100 parts of isatoic anhydride is reacted with 178 parts of 2-diethylaminoethylamine in 400 parts of ethanol according to the procedure described in Example 3 to give 2-amino - N - (2-diethylaminoethyl)benzamide as a colorless oil boiling at about 172° C. at 0.45 mm. pressure. 93.5 parts of this 2-amino-N-(2-diethylaminoethyl)benzamide is reduced with 25 parts of lithium aluminum hydride in 675 parts of tetrahydrofuran according to the procedure described in Example 7 to give 2-amino-N-(2-diethylaminoethyl)benzylamine as a colorless oil boiling at about 111° C. at 0.15 mm. pressure. The reaction of 44 parts of this 2 - amino-N-(2-diethylaminoethyl)benzylamine with 25 parts of phosgene and 20.2 parts of triethylamine in 1080 parts of toluene according to the procedure described in Example 8 gives 3-(2-diethylaminoethyl) - 3,4 - dihydro - 2(1H)-quinazolinone as an oil. This compound has the following formula

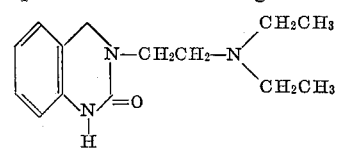

EXAMPLE 14

To a stirred solution of 6.8 parts of 3-phenyl-3,4-dihydro-2-(1H)-quinazolinone in 110 parts of dimethylsulfoxide there is added, under nitrogen, 1.3 parts of sodium hydride as a 56% dispersion in oil. This mixture is stirred for 30 minutes, 5.0 parts of 2-diethylaminoethyl chloride is added, and the resulting mixture is stirred for 16 hours at room temperature. The mixture is then poured into an excess of water and extracted with ether. The combined ether extracts are washed with water and dried over anhydrous potassium carbonate. The solvent is then evaporated from the ether solution to leave a residual oil which is 1 - (2 - diethylaminoethyl) - 3 - phenyl - 3,4 - dihydro - 2(1H)-quinazolinone. The oil is dissolved in ethanol with oxalic acid to form the oxalate salt. This is separated and recrystallized from ethanol to give 1-(2-diethylaminoethyl)-3-phenyl-3,4-dihydro-2(1H)-quinazolinone oxalate melting at about 133–136° C. The free base of this compound has the following formula

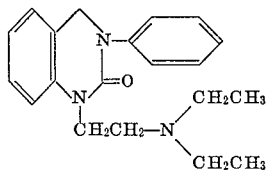

EXAMPLE 15

To a stirred solution of 6.8 parts of 3-phenyl-3,4-dihydro-2(1H) quinazolinone in 110 parts of dimethyl sulfoxide there is added, under nitrogen, 2.8 parts of sodium hydride as a 56% dispersion in oil. This mixture is stirred for 30 minutes, 4.6 parts of 2-dimethylaminopropyl chloride hydrochloride is added, and the mixture is stirred at room temperature for 18 hours. It is then poured into excess water and extracted with ether, and the combined ether extracts are washed with water and dried over anhydrous potassium carbonate. The solvent is then evaporated from the ether solution under reduced pressure and the residual oil is dissolved in ethanol with oxalic acid to give the oxalate salt. This is the oxalate salt of 1-(2-dimethylaminopropyl)-3-phenyl-3,4-dihydro-2(1H)-quinazolinone and it melts at about 203–206° C.

EXAMPLE 16

A solution of 5.2 parts of 3-(4-chlorophenyl)-3,4-dihydro-2(1H)-quinazolinone in 110 parts of dimethyl sulfoxide is reacted first with 0.86 part of sodium hydride dispersion and then with 4.0 parts of 2-diethylaminoethyl chloride according to the procedure described in Example 14. In this case, the product is 1-(2-diethylaminoethyl)-3-(4-chlorophenyl)-3,4-dihydro-2(1H)-quinazolinone. It is a colorless oil and it has the following formula

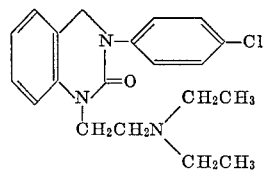

EXAMPLE 17

The reaction of 5.2 parts of 6-chloro-3-phenyl-3,4-dihydro-2(1H)-quinazolinone in 100 parts of dimethyl sulfoxide first with 0.86 part of sodium hydride dispersion and then with 4.0 parts of 2-diethylaminoethyl chloride according to the procedure described in Example 14 gives 6 - chloro - 1 - (2 - diethylaminoethyl) - 3 - phenyl - 3,4 - dihydro-2(1H)-quinazolinone as the oxalate salt melting at about 171–173° C. The free base of this compound has the following formula

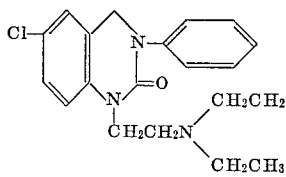

EXAMPLE 18

A solution is prepared from 7.6 parts of 3-(2,4-dimethylphenyl)-3,4-dihydro-2(1H)-quinazolinone and 110 parts of dimethyl sulfoxide. This is reacted first with 1.3 parts of sodium hydride dispersion and then with 5.0 parts of 2-diethylaminoethyl chloride according to the procedure described in Example 14 to give 1-(2-diethylaminoethyl)-3 - (2,4 - dimethylphenyl) - 3,4 - dihydro - 2(1H) - quinazolinone as the oxalate salt melting at about 165–166° C.

EXAMPLE 19

5.2 parts of 3-(4-chlorophenyl)-3,4-dihydro-2(1H)-quinazolinone in 110 parts of dimethyl sulfoxide is reacted first with 2.6 parts of sodium hydride dispersion and then with 4.7 parts of 3-dimethylaminopropyl chloride hydrochloride according to the procedure described in Example 15 to give 1-(3-dimethylaminopropyl)-3-(4-chlorophenyl) - 3,4 - dihydro-2(1H)-quinazolinone as the oxalate salt melting at about 186–188° C.

EXAMPLE 20

Other compounds prepared by the procedure of Example 14 by substituting equivalent quantities of the appropriate starting materials are:

1 - (2 - diethylaminopropyl) - 3 - phenyl-3,4-dihydro-2(1H)-quinazolinone.

1 - (2 - diisopropylaminoethyl) - 3-phenyl-3,4-dihydro-2(1H)-quinazolinone as the oxalate melting at about 113–116° C. after recrystallization from ethanol.

1 - (2 - benzylmethylaminoethyl) - 3-phenyl-3,4-dihydro-2(1H)-quinazolinone as the oxalate melting at about 162–164° C. after recrystallization from ethanol.

1 - (2 - t - butylmethylaminoethyl)-3-phenyl-3,4-dihydro-2(1H)-quinazolinone as a yellow oil.

1 - (2 - diethylaminoethyl) - 3-benzyl - 3,4-dihydro--2(1H)-quinazolione as the oxalate melting at about 137–140° C. after recrystallization from ethanol.

1 - (2 - diethylaminoethyl) - 3-(3-fluorophenyl)-3,4- dihydro-2(1H)-quinazolinone.

1 - (2 - diethylaminoethyl) - 3-(3-trifluorometylphenyl)-3,4-dihydro-2(1H)-quinazolinone as an oil.

1 - (2 - diethylaminoethyl) - 3-(4-tolyl)-3,4-dihydro-2(1H)-quinazolinone.

1 - (2 - diethylaminoethyl) - 3-(4-methoxyphenyl)-3,4-dihydro-2(1H)-quinazolinone as an oil.

1 - (2 - diethylaminoethyl) - (4-benzyloxyphenyl)-3,4-dihydro-2(1H)-quinazolinone melting at about 68–69° C. after recrystallization from ethanol.

1 - (2 - diethylaminoethyl) - 3-(3,4-dimethoxyphenyl)-3,4-dihydro-2(1H)-quinazolinone as an oil.

1 - (2 - diethylaminoethyl) - 3-(3,5-dimethoxyphenyl)-3,4-dihydro-2(1H)-quinazolinone as the oxalate salt melting at about 134–136° C. after recrystallization from a mixture of ethanol and ether.

1 - (2 - diethylaminoethyl) - 3-(2,4-dimethoxyphenyl)-3,4-dihydro-2(1H)-quinazolinone as the oxalate salt melting at about 203–205° C. after recrystallization from ethanol.

1 - (2 - diethylaminoethyl) - 3-(3,4,5-trimethoxyphenyl)-3,4-dihydro-2(1H)-quinazolinone as the oxalate hydrate melting at about 89–97° C. after recrystallization from ethanol.

1 - (2 - piperidinoethyl) - 3-(3,4,5-trimethoxyphenyl)-3,4-dihydro-2(1H)-quinazolinone as the oxalate hydrate melting at about 155–157° C. after recrystallization from ethanol.

1 - [2 - (4 - methyl-1-piperazinyl)ethyl]-3-(3,4,5-trimethoxyphenyl)-3,4-dihydro-2(1H)-quinazolinone as the dioxalate melting at about 229–234° C. after recrystallization from ethanol.

6 - methyl - 1 - (2 - diethylaminoethyl)-3-(3,4,5-trimethoxyphenyl)-3,4-dihydro-2(1H)-quinazolinone as the oxalate hemihydrate melting at about 136–145° C. after recrystallization from ethanol.

7 - methyl - 1 - (2-diethylaminoethyl)-3-phenyl-3,4-dihydro-2(1H)-quinolazinone.

1 - (2 - diethylaminoethyl) - 3-(2,6-dichloro-3-methylphenyl)-3,4-dihydro-2(1H)-quinazolinone as the oxalate melting at about 156–158° C. after recrystallization from ethanol.

1 - (2 - diethylaminoethyl) - 3-(2,4-dimethoxy-5-chlorophenyl)-3,4-dihydro-2(1H)-quinazolinone as the oxalate melting at about 140–143° C. after recrystallization from ethanol.

1 - (2 - morpholinoethyl) - 3 - phenyl-3,4-dihydro-2 (1H)-quinazolinone.

1 - [2 - (1 - pyrrolidinyl)ethyl]-3-phenyl-3,4-dihydro-2(1H)-quinazolinone.

6 - fluoro - 1 - (2-diethylaminoethyl)-3-phenyl-3,4-dihydro-2(1H)-quinazolinone.

1 - (2 - diethylaminoethyl) - 3 - methyl-3,4-dihydro-2(1H)-quinazolinone as an oil.

1-(2-diethylaminoethyl)-3-propyl-3,4 - dihydro-2(1H)-quinazolinone as an oil.

EXAMPLE 21

A solution of 5 parts of 1-(2-diethylaminoethyl)-3-(4-benzyloxyphenyl)-3,4-dihydro - 2(1H) - quinazolinone in 160 parts of ethanol is hydrogenated at atmospheric pressure and room temperature using 0.5 part of 5% palladium on charcoal catalyst. The resultant mixture is filtered and the solvent is evaporated from the filtrate to leave a residual oil which is dissolved in ethanol with oxalic acid. The oxalate salt which forms is separated and recrystallized from ethanol to give 1-(2-diethylaminoethyl)-3-(4-hydroxyphenyl)-3,4-dihydro-2(1H)-quinazolinone oxalate melting at about 157–158° C.

EXAMPLE 22

A mixture of 12.9 parts of 3-(4-chlorophenyl)-3,4-dihydro-2(1H)-quinazolinone, 3.1 parts of granular potassium hydroxide, and 8.7 parts of 3-bromo-1-chloropropane in 200 parts of 2-butanone is refluxed for 18 hours. One hundred parts of water is then added to the mixture and the 2-butanone is evaporated under reduced pressure. The residual material is extracted with ether and the resultant ether solution is dried over sodium sulfate. The solvent is then evaporated from the ether solution and the residue is dissolved in hexane and filtered and the solvent is evaporated from the filtrate to leave a residual amber oil which is crude 1-(3-chloropropyl)-3-(4-chlorophenyl)-3,4-dihydro-2(1H)-quinazolinone. This oil is mixed with 13.5 parts of 1-(3-chlorophenyl)piperazine dihydrochloride, one part of sodium iodide, and 20 parts of powdered potassium carbonate in 200 parts of 2-butanone and the mixture is stirred and refluxed for 18 hours. The mixture is then poured into water and extracted with ether. The combined ether extracts are dried over potassium carbonate and the solvent is evaporated under reduced pressure to leave a residual viscous oil which crystallizes on standing. This is recrystallized from ethanol to give 1-{3-[4-(3-chlorophenyl)-1-piperazinyl]propyl}-3-(4 - chlorophenyl)-3,4-dihydro - 2(1H) - quinazolinone melting at about 162–169° C. This compound has the following formula

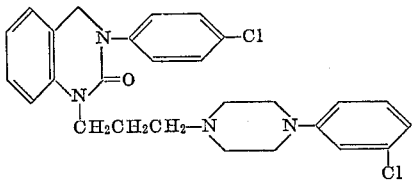

EXAMPLE 23

Equivalent quantities of 1-methylpiperazine, 1-phenylpiperazine, 1-(4-fluorophenyl)piperazine, and 1-(3-tolyl)piperazine are each substituted for the 1-(3-chlorophenyl)piperazine and the procedure of Example 22 is repeated to give the corresponding disubstituted piperazine in each instance.

EXAMPLE 24

A solution of 2.0 parts of 1-(2-diethylaminopropyl)-3-phenyl-3,4-dihydro-2(1H)-quinazolinone and 2 parts of ethyl iodide in 16 parts of acetone is placed in a citrate bottle and heated in a steam cabinet for 64 hours. The precipitate which forms is separated by filtration to give 1-(2-diethylaminopropyl)-3-phenyl - 3,4 - dihydro-2(1H)-quinazolinone ethiodide melting at about 198–200° C.

Similarly, 3.5 parts of 1-(2-t-butylmethylaminoethyl)-3-phenyl-3,4-dihydro-2(1H)-quinazolinone is reacted with 3.0 parts of methyl bromide at room temperature for 64 hours to give 1-(2-t-butylmethylaminoethyl)-3-phenyl-3,4-dihydro-2(1H)-quinazolinone methobromide melting at about 184–187° C. with decomposition.

Likewise, 3.2 parts of 6-chloro-1(2-diethylaminoethyl)-3-phenyl-3,4-dihydro-2(1H)-quinazolinone is reacted with 3.0 parts of methyl bromide at room temperature for 16 hours to give 6-chloro-1-(2-diethylaminoethyl)-3-phenyl-3,4-dihydro-2(1H)-quinazolinone methobromide melting at about 258–262° C.

EXAMPLE 25

If the procedure of Example 14 is repeated starting with the appropriate 1-substituted 3,4-dihydro-2(1H)-quinazolinone and an aminoalkyl halide, the corresponding 3-amino-alkyl compound is obtained. Thus, 1-methyl-3,4-dihydro-2(1H)-quinazolinone is reacted with the appropriate aminoalkyl chloride to give the following compounds:

1-methyl-3-(2-diethylaminoethyl) - 3,4-dihydro-2(1H)-quinazolinone as the oxalate melting at about 133–134° C.

1-methyl-3-(2-diethylaminopropyl)-3,4-dihydro-2(1H)-quinazolinone as an oil.

1-methyl-3 - (3 - dimethylaminopropyl) - 3,4 - dihydro-2(1H)-quinazolinone.

1-methyl-3-(2-piperidinoethyl) - 3,4 - dihydro - 2(1H)-quinazolinone as the oxalate salt melting at about 167–168° C.

1-methyl - 3 - [2 - (1 - pyrrolidinyl)ethyl]-3,4-dihydro-2(1H)-quinazolinone.

1-methyl-3-[2-(4-methyl-1-piperazinyl)ethyl] - 3,4 - dihydro-2(1H)-quinazolinone.

In the same way, 1-phenyl-3,4-dihydro-2(1H)-quinazolinone is reacted with 2-diethylaminoethyl chloride to give 3-(2-diethylaminoethyl)-1-phenyl - 3,4 - dihydro - 2(1H)-quinazolinone as the oxalate salt melting at about 169–170° C. Likewise, 1-benzyl-3,4-dihydro-2(1H)-quinazolinone is reacted with 2-diethylaminoethyl chloride to give 3-(2-diethylaminoethyl)-1-benzyl - 3,4 - dihydro - 2(1H)-quinazolinone as the oxalate salt melting at about 153–155° C.

What is claimed is:

1. A member selected from the group consisting of compounds of the formula

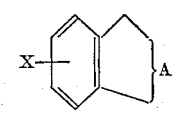

wherein X is selected from the group consisting of hydrogen, methyl, and halogen and A is

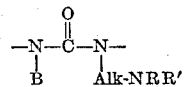

wherein Alk is lower alkylene separating the nitrogens attached thereto by at least 2 carbon atoms; —NRR' is selected from the group consisting of di(lower alkyl) amino, 1-pyrrolidinyl, piperidino, morpholino, benzylmethylamino, and 1-piperazinyl having an R'' substituent at the 4-position; R'' is selected from the group consisting of methyl, phenyl, tolyl, and halophenyl; B is selected from the group consisting of hydrogen, lower alkyl, benzyl, and

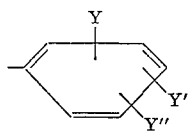

wherein Y, Y', and Y" are each selected from the group consisting of hydrogen, methyl, halogen, hydroxy, methoxy, benzyloxy, and trifluoromethyl; and the pharmaceutically acceptable acid addition and lower alkyl halide quaternary ammonium salts thereof.

2. A compound according to claim 1 which has the formula

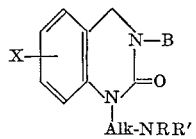

wherein X is selected from the group consisting of hydrogen, methyl, and halogen; Alk is lower alkylene separating the nitrogens attached thereto by at least two carbon atoms, —NRR' is selected from the group consisting of di(lower alkyl)amino, benzylmethylamino, 1-pyrrolidinyl, piperidino, morpholino, and 1-piperazinyl having an R" substituent at the 4-position; R" is selected from the group consisting of methyl, phenyl, tolyl, and halophenyl; B is selected from the group consisting of lower alkyl, benzyl, and

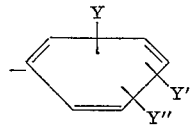

wherein Y, Y', and Y" are each selected from the group consisting of hydrogen, methyl, halogen, hydroxy, methoxy, benzyloxy, and trifluoromethyl.

3. A compound according to claim 1 which has the formula

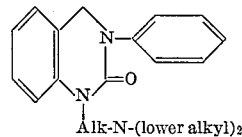

wherein Alk is lower alkylene separating the nitrogens attached thereto by at least 2 carbon atoms.

4. A compound according to claim 1 which is 1-(2-diethylaminoethyl) - 3-phenyl-3,4-dihydro-2(1H)-quinazolinone.

5. A ompound according to claim 1 which is 1-(2-diethylaminoethyl) - 3-(2,4-dimethylphenyl)-3,4-dihydro-2(1H)-quinazolinone.

6. A compound according to claim 1 which has the formula

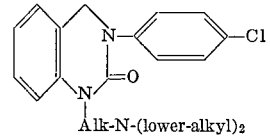

wherein Alk is lower alkylene separating the nitrogens attached thereto by at least 2 carbon atoms.

7. A compound according to claim 1 which is 1-(2-diethylaminoethyl) - 3 - (4-chlorophenyl) - 3,4-dihydro-2(1H)-quinazolinone.

8. A compound according to claim 1 which is 1-(3-dimethylaminopropyl) - 3-(4-chlorophenyl)-3,4-dihydro-2(1H)-quinazolinone.

9. A compound according to claim 1 which is 6-chloro-1 - (2 - diethylaminoethyl)-3-phenyl-3,4-dihydro-2(1H)-quinazolinone.

10. A compound according to claim 1 which is 6-chloro - 1-(2-diethylaminoethyl)-3-phenyl-3,4-dihydro-2(1H)-quinazolinone methobromide.

11. A compound according to claim 1 which is 1-(2 - diethylaminoethyl)-3-(3,4,5-trimethoxyphenyl)-3,4-dihydro-2(1H)-quinazolinone.

12. A compound according to claim 1 which is 3-(2 - diethylaminoethyl) - 1 - methyl-3,4-dihydro-2(1H)-quinazolinone.

References Cited

UNITED STATES PATENTS

| | | | |
|---|---|---|---|
| 3,215,697 | 11/1965 | Hauptmann et al. | 260—256.4 |
| 3,257,397 | 6/1966 | Bolger | 260—256.4 |
| 3,265,696 | 8/1966 | Schipper | 260—256.4 |
| 3,274,194 | 9/1966 | Hayao | 260—256.4 |

ALEX MAZEL, Primary Examiner

R. J. GALLAGHER, Assistant Examiner

U.S. Cl. X.R.

260—247.1, 247.2, 251, 256.5, 558; 424—251

UNITED STATES PATENT OFFICE
CERTIFICATE OF CORRECTION

Patent No. 3,528,982         Dated September 15, 1970

Inventor(s) John W. Cusic and William E. Coyne

It is certified that error appears in the above-identified patent and that said Letters Patent are hereby corrected as shown below:

Column 9, lines 70-75, that portion of the formula reading

Column 10, line 47, "1-(2-diethylaminoethyl)-(4-"
should read    -- 1-(2-diethylaminoethyl)-3-(4- --.

Column 11, line 18, cancel "as an oil."

SIGNED AND SEALED
DEC 1 - 1970

(SEAL)
Attest:

Edward M. Fletcher, Jr.
Attesting Officer

WILLIAM E. SCHUYLER, JR.
Commissioner of Patents